No. 694,465. Patented Mar. 4, 1902.
J. W. EVANS.
HITCHING DEVICE.
(Application filed July 22, 1901.)
(No Model.)
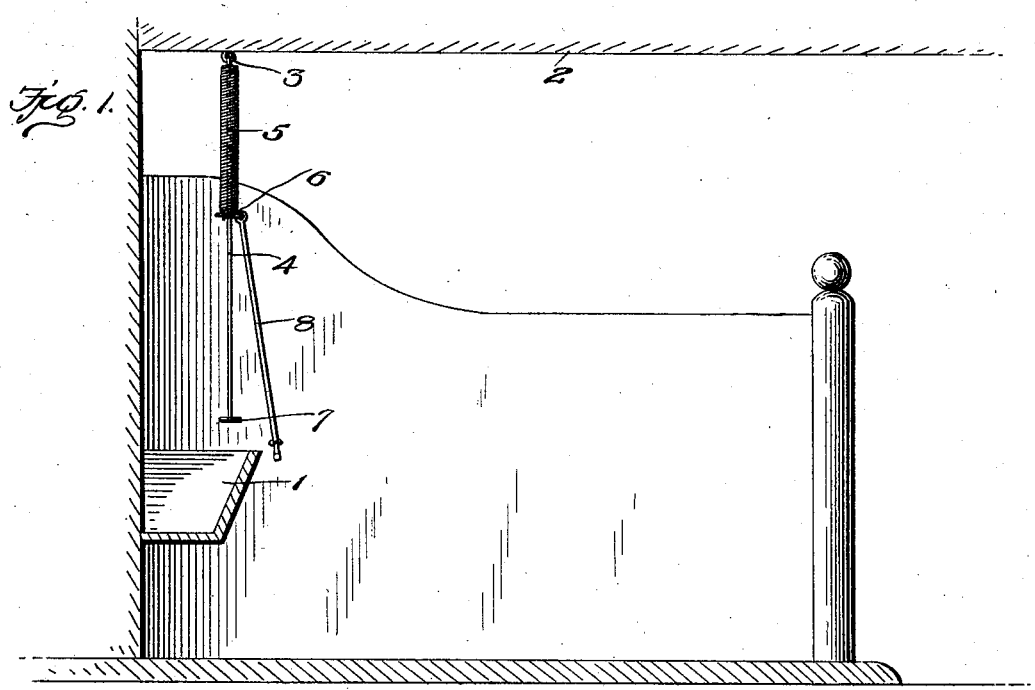
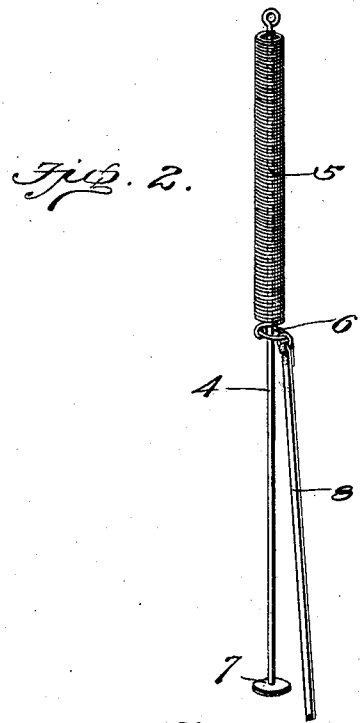
Inventor
John W. Evans
By H. B. Willson & Co.
Attorneys
Witnesses

UNITED STATES PATENT OFFICE.

JOHN W. EVANS, OF GREENVILLE, MISSOURI.

HITCHING DEVICE.

SPECIFICATION forming part of Letters Patent No. 694,465, dated March 4, 1902.

Application filed July 22, 1901. Serial No. 69,303. (No model.)

*To all whom it may concern:*

Be it known that I, JOHN W. EVANS, a citizen of the United States, residing at Greenville, in the county of Wayne and State of Missouri, have invented certain new and useful Improvements in Hitching Devices; and I do declare the following to be a full, clear, and exact description of the invention, such as will enable others skilled in the art to which it appertains to make and use the same.

This invention relates to hitching devices, and particularly to a hitching attachment for mangers for securing a horse to the manger or in the stall, so that he may feed anywhere in the manger or lie down without inconvenience and without the danger incident to the use of a long strap or rope, in which the horse is liable to become entangled.

The object of the invention is to provide a hitching device which is simple, safe, and secure and which is adapted to automatically lengthen and take up the slack in the halter rope or strap as the horse moves away from or toward the manger, thereby obviating all liability of injury to the horse by becoming entangled in the strap.

With this and other objects in view the invention consists of certain novel features of construction, combination, and arrangement of parts, as will be hereinafter more fully described, and particularly pointed out in the appended claim.

In the accompanying drawings, Figure 1 is a longitudinal section through a stall, illustrating the application of the invention; and Fig. 2 is a perspective view of the invention on an enlarged scale.

Referring now more particularly to the drawings, the numeral 1 represents the feed-box or manger of a stall of any ordinary or preferred construction, and 2 the ceiling of the stall or a suitable support arranged above the manger.

Fixed in the ceiling or support 2 is a staple or eye 3, to which is connected the upper end of a swinging rod 4, which hangs vertically above the manger and is adapted to swing laterally or longitudinally of the stall to allow the horse to have ample freedom of movement in either direction. To the upper end of the rod 4 is secured one end of a coiled spring 5, which encircles or encompasses the rod and is connected at its lower end to a hitch-ring 6, which is fitted to slide upon said rod and is limited in its outward or downward movement by a stop 7 upon the lower end of the rod. A hitch strap or rope 8 is attached at one end to the ring 6 and is adapted to be secured at its opposite end to the halter, whereby the horse is confined. As the rod 7 is free to swing both longitudinally and laterally of the stall, it will be seen that the horse will have ample freedom of movement in either direction within a determined limit and that as the spring 5 is adapted to be extended to a length corresponding to that of the swinging rod 4 the hitch strap or rope 8 may be lengthened or shortened, so that the horse may lie down without inconvenience, the said rope or strap being allowed to pay out when the horse lies down by the expansion of the spring, which when the horse rises and approaches the manger contracts, and thereby takes up the slack, so as to avoid all liability of the horse becoming entangled in the rope or strap and suffering injury. The invention thus provides a simple and effective device which obviates the objection incident to the use of a long rope or strap and may be supplied at a comparatively low cost.

From the foregoing description, taken in connection with the accompanying drawings, the construction, mode of operation, and advantages of the invention will be readily understood, and it will be seen that the invention provides a device which is exceedingly useful for the purpose for which it is designed.

Various changes in the form, proportion, and minor details of construction may be made within the scope of the invention without departing from the spirit or sacrificing any of the advantages thereof.

Having thus described my invention, what I claim, and desire to secure by Letters Patent, is—

A hitching device of the character described, comprising a swinging rod, means for hinging the upper end of the rod to a suitable support, a hitch-ring slidably mounted on the rod, an expansion-spring surrounding the rod and connected at one end thereto and at the other end to said ring, and a stop upon the lower end of the rod to limit the movement of the ring, substantially as described.

In testimony whereof I have hereunto set my hand in presence of two subscribing witnesses.

JOHN W. EVANS.

Witnesses:
   THOS. GILBREATH,
   W. M. WOODS.